United States Patent [19]

Hasegawa

[11] Patent Number: 4,640,148

[45] Date of Patent: Feb. 3, 1987

[54] STEERING MECHANISM OF RACK-AND-PINION TYPE

[75] Inventor: Akira Hasegawa, Toyota, Japan

[73] Assignee: Toyota Jidosha Kabushiki Kaisha, Aichi, Japan

[21] Appl. No.: 756,276

[22] Filed: Jul. 18, 1985

[30] Foreign Application Priority Data

Jul. 19, 1984 [JP] Japan ............................ 59-109445[U]

[51] Int. Cl.$^4$ .............................................. B62D 3/12
[52] U.S. Cl. ......................................... 74/422; 74/498
[58] Field of Search ................... 74/388 PS, 409, 422, 74/498; 180/147, 148

[56] References Cited

U.S. PATENT DOCUMENTS 3,897,845  8/1975  Von Lowis of Menar .......... 74/498

FOREIGN PATENT DOCUMENTS

| 2201418 | 8/1972 | Fed. Rep. of Germany | ........ 74/498 |
| 54-138239 | 10/1979 | Japan | .................................. 74/498 |
| 55-22538 | 2/1980 | Japan | .................................. 180/148 |
| 655130 | 7/1951 | United Kingdom | .................. 74/498 |

Primary Examiner—Lawrence Staab
Attorney, Agent, or Firm—Parkhurst & Oliff

[57] ABSTRACT

In a steering mechanism of the rack-and-pinion type including a pinion shaft rotatably mounted within a gear housing and a rack member axially slidably carried on the gear housing and being in mesh with the pinion shaft, a guide member is slidably disposed within a radial cylinder portion of the gear housing and has a thrust surface for slidable engagement with the rear surface of the rack member, and a compression spring is interposed between the guide member and a closure member threaded into the radial cylinder portion to bias the guide member toward the rack member. The rack member is formed at the rear portion thereof with an axial cam groove, a cam follower element is slidably disposed within an axial bore of the guide member and engaged at one end thereof with the axial cam groove of the rack member to cause rotation of the rack member in its circumferential direction, and a piston is slidably disposed within a counter bore in the closure member to form a pressure chamber for connection to a hydraulic pressure source and engaged at one end thereof with the cam follower element to effect movement of the cam follower element toward the rack member in accordance with a hydraulic pressure applied thereto in the pressure chamber.

3 Claims, 3 Drawing Figures

STEERING MECHANISM OF RACK-AND-PINION TYPE

BACKGROUND OF THE INVENTION

The present invention relates to a steering mechanism for wheeled vehicles, and more particularly to an improvement of a steering mechanism of the rack-and-pinion type.

In general, a conventional rack-and-pinion type steering mechanism includes a gear housing integrally formed at one side thereof with a radial cylinder portion, a pinion shaft rotatably mounted within the gear housing and being operatively connected to a steering wheel, a rack member axially slidably carried on the gear housing across the pinion shaft and being in mesh with the pinion shaft at the toothed portion thereof to be moved in response to rotation of the pinion shaft, a guide member slidably disposed within the radial cylinder portion of the gear housing to be moved toward and away from the rack member and having a thrust surface for slidable engagement with the rear surface of the rack member, a closure member adjustably threaded into the radial cylinder portion of the gear housing, and a compression spring interposed between the guide member and the closure member to bias the guide member toward the rack member.

In the steering mechanism described above, it is desirable that the operator's effort applied to the steering wheel is reduced during low speed travel of the vehicle and is weighted during high speed travel of the vehicle. For such control of the operator's effort in his steering operation, a steering mechanism has been proposed in an Early Publication of the Japanese Utility Model Application No. 54-138239, wherein the space between the guide member and the closure member is formed as a pressure chamber arranged to be supplied with fluid under pressure proportional to rotational speed of a prime mover of the vehicle. With such an arrangement of the pressure chamber in the steering mechanism, the sliding resistance of the rack member can be adjusted in accordance with the rotational speed of the prime mover so that the operator's effort in his steering operation is reduced during low speed travel of the vehicle and is weighted during high speed travel of the vehicle. Furthermore, the hydraulic pressure acting on the rack member serves to increase the support rigidity of the rack member at its meshed portion with the pinion shaft and to decrease a backlash between the pinion shaft and the rack member. However, the guide member does not act to restrict rotation of the rack member in a circumferential direction. For this reason, the rotation of the rack member causes a circumferential interspace between the rack member and the pinion shaft, resulting in decrease of the support rigidity of the rack member.

SUMMARY OF THE INVENTION

It is, therefore, a primary object of the present invention to provide an improved steering mechanism wherein the rack member is applied with a rotational torque in accordance with travel speed of the vehicle to control the support rigidity of the rack member and to control the backlash between the rack member and the pinion shaft.

Another object of the present invention is to provide an improved steering mechanism, having the above-described characteristic, wherein the support rigidity of the rack member is controlled to enhance the operator's feel in his steering operation during high speed travel of the vehicle and to eliminate unpleasant noises caused by the backlash between the rack member and the pinion shaft.

A futher object of the present invention is to provide an improved steering mechanism, having the above-described characteristic, wherein the sliding resistance of the rack member is decreased during low speed travel of the vehicle to reduce the operator's effort in his steering operation and to ensure smooth return operation of the steering wheel.

A still further object of the present invention is to provide an improved steering mechanism, having the above-described characteristic, wherein the sliding resistance of the rack member is decreased in a predetermined high speed range of the vehicle to restrain an occurrence of flutter of the steering wheel.

According to the present invention, the above objects are accomplished by providing a steering mechanism of the rack-and-pinion type wherein the rack member is formed at the rear portion thereof with an axial cam groove, a cam follow element is slidably disposed within an axial bore of the guide member and engaged at one end thereof with the axial cam groove of the rack member to cause rotation of the rack member in its circumferential direction, and a piston is slidably disposed within a counter bore in said closure member to form a pressure chamber for connection to a hydraulic pressure source and engaged at one end thereof with the cam follower element to effect movement of the cam follower element toward the rack member in accordance with a hydraulic pressure applied thereto in the pressure chamber, and wherein the hydraulic pressure source is preferably responsive to a vehicle speed for supply of fluid under pressure proportional to the vehicle speed.

BRIEF DESCRIPTION OF THE DRAWINGS

Additional objects, features and advantages of the present invention will become readily apparent from the following detailed description of preferred embodiments thereof when considered with reference to the accompanying drawings, in which.

DETAILED DESCRIPTION OF THE PREFERRED EMBODIMENTS

Figure 1:
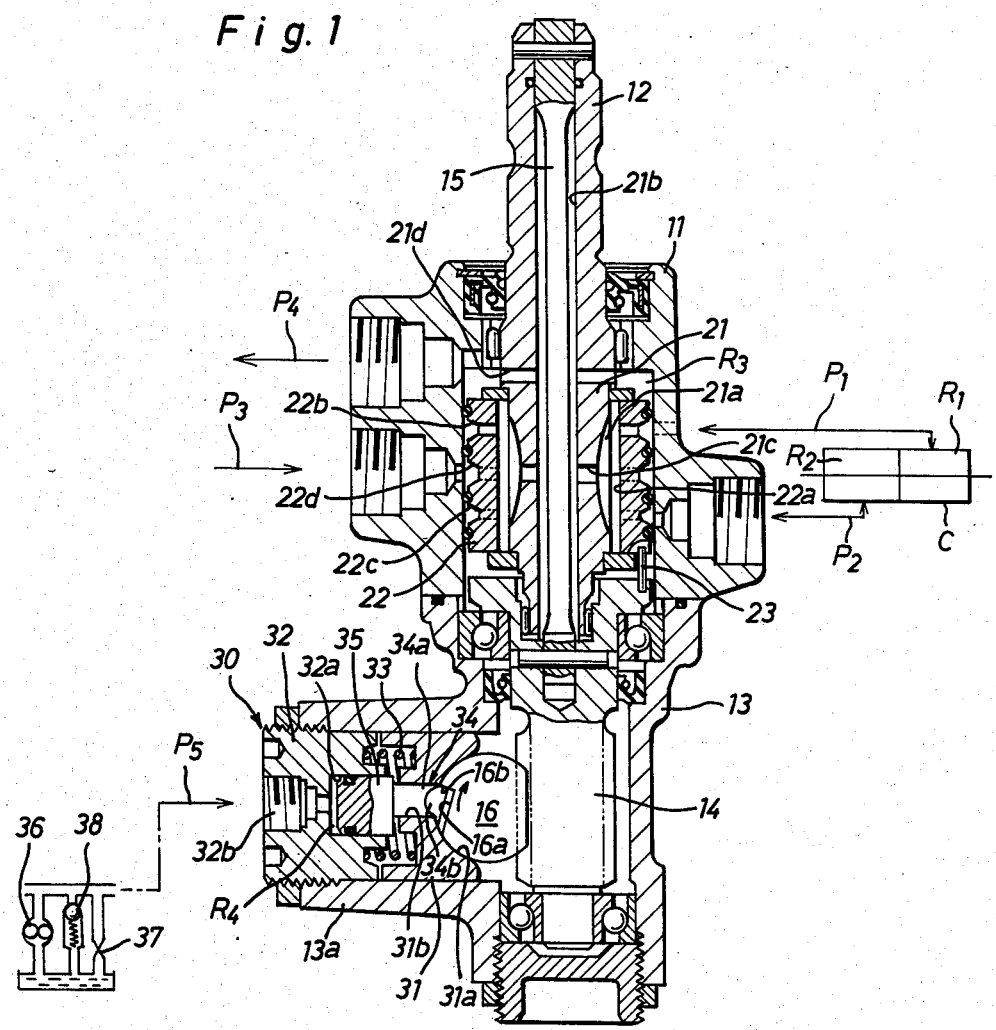
FIG. 1 is a sectional view of an embodiment of a power-assisted steering mechanism in accordance with the present invention.

Referring now to the drawings, particularly in FIG. 1, there is schematically illustrated an embodiment of a power-assisted steering mechanism of the rack-and-pinion type in accordance with the present invention, wherein input and output shafts 12 and 14 are rotatably mounted within a valve housing 11 and a gear housing 13, respectively, and interconnected by means of a torsion bar 15 for relative rotation on aligned axes. The valve housing 11 is fitted to the gear housing 13 in a fluid-tight manner. The input shaft 12 is in the form of a hollow shaft arranged to be operatively connected in a usual manner to a steering wheel (not shown), while the output shaft 14 is in the form of a pinion shaft permanently in mesh with the toothed portion of a rack member 16. The rack member 16 is formed as an intermediate portion of a piston rod of a power cylinder C, which is operatively connected in a usual manner to steering road wheels (not shown).

The input shaft 12 is integrally formed with a valve rotor 21 which is contained within the valve housing 11 and coupled within a valve sleeve 22 for relative rotation therewith. The valve rotor 21 is formed at the outer periphery thereof with a plurality of circumferentially equi-spaced axial grooves 21a of semicircular cross-section and is formed therein with a plurality of radial passages 21c which provide fluid communication between a part of the axial grooves 21a and an internal axial bore 21b of shaft 12. The valve rotor 21 is further formed with radial passages 21d which are located above the valve sleeve 22 to provide fluid communication between the internal axial bore 21b and an upper chamber $R_3$ in the valve housing 11. The valve sleeve 22 is concentrically assembled with the valve rotor 21 and connected at its lower end to the upper end of pinion shaft 14 by means of a connecting pin 23. Thus, the valve sleeve 22 cooperates with the valve rotor 21 to provide a changeover valve of the rotary type.

In the above arrangement, the valve sleeve 22 is formed at the inner periphery thereof with a plurality of circumferentially equi-spaced axial grooves 22a and formed at the outer periphery thereof with upper and lower annular grooves 22b and 22c. A part of axial grooves 22a is in open communication with the upper annular groove 22b, while the other part of axial grooves 22a is in open communication with the lower annular groove 22c. The upper annular groove 22b is connected to a right-hand pressure chamber $R_1$ in power cylinder C by way of a fluid conduit $P_1$, while the lower annular groove 22c is connected to a left-hand pressure chamber $R_2$ in power cylinder C by way of a fluid conduit $P_2$. The valve sleeve 22 is further formed at the outer periphery thereof with a central annular groove 22d which is connected through a fluid conduit $P_3$ to a primary hydraulic pressure source in the form of a hyraulic pump driven by a prime mover of the vehicle. The upper chamber $R_3$ in valve housing 11 is connected to a reservoir tank (not shown) by way of a fluid concuit $P_4$.

When relative rotation occurs between the input and output shafts 12 and 14, fluid under pressure from the primary hydraulic pressure source is supplied into the central annular groove 22d of valve sleeve 22 by way of the fluid conduit $P_3$ and is selectively supplied into one of the pressure chambers $R_1$ and $R_2$ in power cylinder C across one part of the axial grooves 22a, one of the annular grooves 22b and 22c, and one of the fluid conduits $P_1$ and $P_2$, while the exhausted fluid from the other pressure chamber $R_2$ or $R_1$ in power cylinder C is discharged into the reservoir tank by way of the other fluid conduit $P_2$ or $P_1$, annular groove 22c or 22b, radial passages 21c, internal axial bore 21b, radial passage 21d and fluid conduit $P_4$. This will provide a hydraulic power assist to the operator's effort applied to the steering wheel during turning maneuvers of the vehicle.

In the above-described embodiment, the rack member 16 is axially slidably carried on the gear housing 13 across the pinion shaft 14 and is in meshing engagement with the pinion portion of shaft 14 under a thrust force applied thereto from a thrust mechanism 30 assembled within a radial cylinder portion 13a of gear housing 13. The thrust mechanism 30 comprises a guide member 31 slidable in the radial cylinder portion 13a of gear housing 13 to be moved toward and away from the rack member 16, a cam follower element 34 slidable in an axial bore 31b of guide member 31, a closure plug 32 adjustably threaded into the outer end of radial cylinder portion 13a, a compression coil spring 33 interposed between the guide member 31 and the closure plug 32, and a piston 35 slidably disposed within a counter bore 32a of closure plug 32 in a fluid-tight manner. The guide member 31 is in the form of a columnar member which is formed at the inner end thereof with a semicylindrical thrust surface 31a for slidable engagement with the rear surface of rack member 16. Thus, the guide member 31 is pressed into contact with the rear surface of rack member 16 at its semicylindrical thrust surface 31a under the biasing force of compression spring 33 in such a way as to permit axial sliding movement of the rack member 16.

The rack member 16 is formed at the rear portion thereof with an axial cam groove 16a having an elongated cam surface 16b. The cam follower element 34 has a rod portion 34a slidable in the axial bore 31b of guide member 31 and a cam portion 34b in engagement with the elongated cam surface 16b of rack member 16. The cam portion 34b of follower element 34 is formed to cause clockwise rotation of the rack member 16 by engagement with the elongated cam surface 16b of cam groove 16a in its forward movement. The piston 35 is arranged to form a pressure chamber $R_4$ in the counter bore 32a of closure plug 32 and is engaged at the inner end thereof with the rod portion 34a of element 34. The closure plug 32 is formed with an inlet port 32b through which the pressure chamber $R_4$ is connected to a secondary hydraulic pressure source by way of a fluid conduit $P_5$. The secondary hydraulic pressure source is arranged to supply fluid under pressure responsive to the vehicle speed, which source may comprise a hydraulic pump 36 driven by a propeller shaft of the vehicle, an orifice means 37 for regulating an initial hydraulic pressure applied to the pressure chamber $R_4$, and a relief valve 38 for determining a maximum value of the hydraulic pressure.

Figure 2:
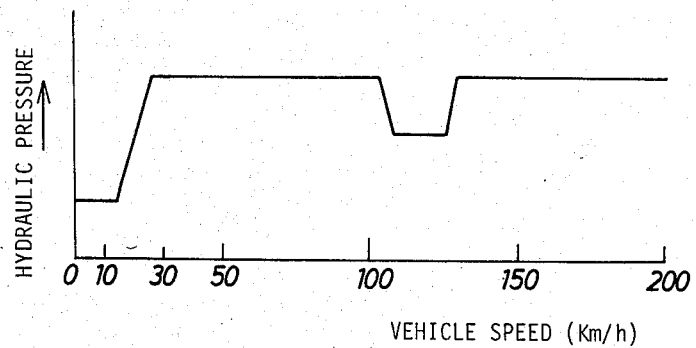
FIG. 2 is a graph illustrating a hydraulic pressure applied to a rack member in the steering mechanism in relation to travel speed of the vehicle.

In the above-described arrangement of the thrust mechanism 30, the piston 35 is moved by a hydraulic pressure applied to the pressure chamber $R_4$ from the second hydraulic pressure source to effect forward movement of the cam follower element 34, and in turn, the cam follower element 34 causes clockwise rotation of the rack member 16 by engagement with the elongated cam surface 16b of groove 16a in accordance with the hydraulic pressure in chamber $R_4$. Thus, the support rigidity and sliding resistance of rack member 16, and the backlash between the pinion shaft and the rack member are controlled in accordance with the hydraulic pressure in chamber $R_4$. In the case that the hydraulic pressure in chamber $R_4$ is controlled in accordance with the vehicle speed as shown in FIG. 2, the sliding resistance of rack member 16 is decreased at a low speed range of the vehicle to reduce the operator's effort applied to the steering wheel and to effect smooth return operation of the steering wheel. When the vehicle speed reaches a medium or high speed range, the support rigidity of rack member 16 is increased to enhance the operator's feel in his steering operation and to decrease the backlash between the pinion shaft 14 and the rack member 16 for eliminating unpleasant noises. When the hydraulic pressure in chamber $R_4$ decreases at a predetermined high speed range (for instance, 110–130

Km/h) of the vehicle, the sliding resistance of rack member 16 is decreased to restrain an occurrence of flutter of the steering wheel.

Figure 3:
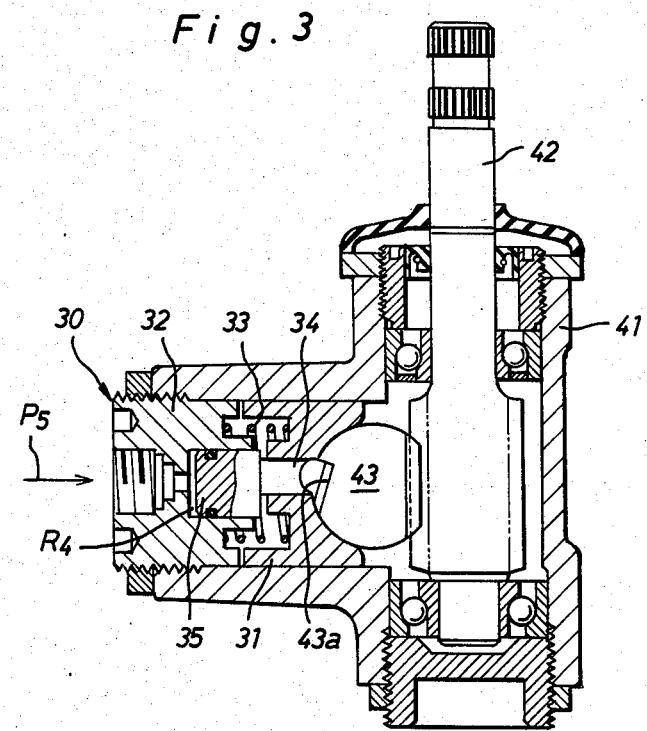
FIG. 3 is a sectional view of another embodiment of the present invention.

In FIG. 3, there is illustrated another embodiment of the present invention which is adapted to a manual steering mechanism of the rack-and-pinion type. In this embodiment, a pinion shaft 42 is rotatably mounted within a gear housing 41 and arranged to be operatively connected to a steering wheel (not shown). The pinion shaft 42 is permanently in mesh with a rack member 43 which is formed at the rear portion thereof with an axial cam groove 43a for engagement with the cam follower element 34 of the thrust mechanism 30 shown in FIG. 1. The other construction is substantially the same as that of the above-described embodiment.

What is claimed is:

1. A steering mechanism of the rack-and-pinion type comprising a gear housing integrally formed at one side thereof with a radial cylinder portion, a pinion shaft rotatably mounted within said gear housing and arranged to be operatively connected to a steering wheel, a rack member axially slidably carried on said gear housing across said pinion shaft and being in mesh with said pinion shaft to be moved in response to rotation of said pinion shaft, a guide member slidably disposed within the radial cylinder portion of said gear housing and having a thrust surface for slidable engagement with the rear surface of said rack member, a closure member threaded into the radial cylinder portion of said gear housing and fastened in place, and a compression spring interposed between said guide member and said closure member to bias said guide member toward said rack member, wherein said rack member is formed at the rear portion thereof with an axial cam groove, a cam follower element is slidably disposed within an axial bore of said guide member and engaged at one end thereof with the axial cam groove of said rack member to cause rotation of said rack member in its circumferential direction, and a piston is slidably disposed within a counter bore in said closure member to form a pressure chamber for connection to a hydraulic pressure source and engaged at one end thereof with said cam follow element to effect movement of said cam follower element toward said rack member in accordance with a hydraulic pressure applied thereto in said pressure chamber.

2. A steering mechanism of the rack-and-pinion type as claimed in claim 1, wherein said pressure chamber formed by said piston is connected to a hydraulic pressure source responsive to a vehicle speed for supply of fluid under pressure proportional to the vehicle speed.

3. A steering mechanism of the rack-and-pinion type as claimed in claim 1, wherein said cam follow element has a rod portion slidable in the axial bore of said guide member, and a cam portion in engagement with the axial cam groove of said rack member.

* * * * *